United States Patent [19]
Brettrager

[11] 3,797,681
[45] Mar. 19, 1974

[54] APPARATUS FOR MOUNTING A WINCH ON A TRAILER

[76] Inventor: Norman A. Brettrager, 5270 East St., Saginaw, Mich. 48601

[22] Filed: Apr. 13, 1972

[21] Appl. No.: 243,653

[52] U.S. Cl............. 214/85.5, 280/414 R, 254/166
[51] Int. Cl.............................................. B60p 3/10
[58] Field of Search ............ 214/505, 506, 84, 85.5, 214/85.1, 500; 280/414 R; 254/145, 166

[56] References Cited
UNITED STATES PATENTS

| | | | |
|---|---|---|---|
| 2,558,418 | 6/1951 | Brueckman | 214/85.1 X |
| 3,077,998 | 2/1963 | Balko et al | 214/505 X |

Primary Examiner—Albert J. Makay

[57] ABSTRACT

Apparatus for mounting a winch on a trailer comprises an upright body having its lower end slideably and removably accommodated in a sleeve mounted at one end of the supporting bed of a trailer. At its upper end the body carries a rotary winch and a force transmitting line that is adapted to be attached to an article that is to be supported on the trailer. Between its ends the body carries a laterally projecting foot which overlies the trailer bed, a brace extending between and being connected to both the foot and the body. Releasable latch means are carried at the lower end of the body to prevent inadvertent removal of the latter from the sleeve.

5 Claims, 3 Drawing Figures

PATENTED MAR 19 1974  3,797,681

3,797,681

APPARATUS FOR MOUNTING A WINCH ON A TRAILER

The invention disclosed herein relates to a winch supporting device and more particularly to apparatus for removably supporting a winch at one end of a wheeled trailer.

A trailer of the kind used to transport one or more snowmobiles conventionally has a load-supporting bed mounted on the trailer's frame in such manner as to enable the bed to be tilted from a substantially horizontal position to an inclined position in which the snowmobile may be loaded onto and removed from the trailer. Theoretically, a snowmobile may be driven under its own power onto the inclined trailer bed, but in actual practice the driving of a snowmobile onto such a trailer bed is extremely hazardous. In many instances so much power must be applied to the driving track of the snowmobile in order to drive the latter onto the trailer bed that is is impossible to stop the vehicle before it plunges off the opposite end of the trailer. This problem can be overcome by providing the trailer with a winch equipped with a line or cable which can be coupled to the snowmobile, whereupon rotation of the winch will enable the snowmobile to be loaded onto the trailer. Winch-equipped trailers in use heretofore, however, have the winches permanently mounted on the trailers with the result that the winches are exposed to the ravages of weather, as well as to the possibility of theft. In addition, a trailer adapted to carry two snowmobiles must have either two winches or sacrifice operating efficiency if it has only one winch.

An object of this invention is to provide apparatus for removably supporting a winch on a trailer so as to overcome the disadvantages of permanently affixed winches.

Another object of the invention is to provide winch mounting means which enables the rapid mounting and demounting of a winch with no sacrifice of rigidity over that of a permanently affixed winch.

A further object of the invention is to provide apparatus of the character described which is capable of use with trailers having structural members normally incapable of withstanding forces imposed on them by the reaction due to the weight of a snowmobile.

Other objects and advantages of the invention will be pointed out specifically or will become apparent from the following description when it is considered in conjunction with the appended claims and the accompanying drawings, in which:

Figure 1:
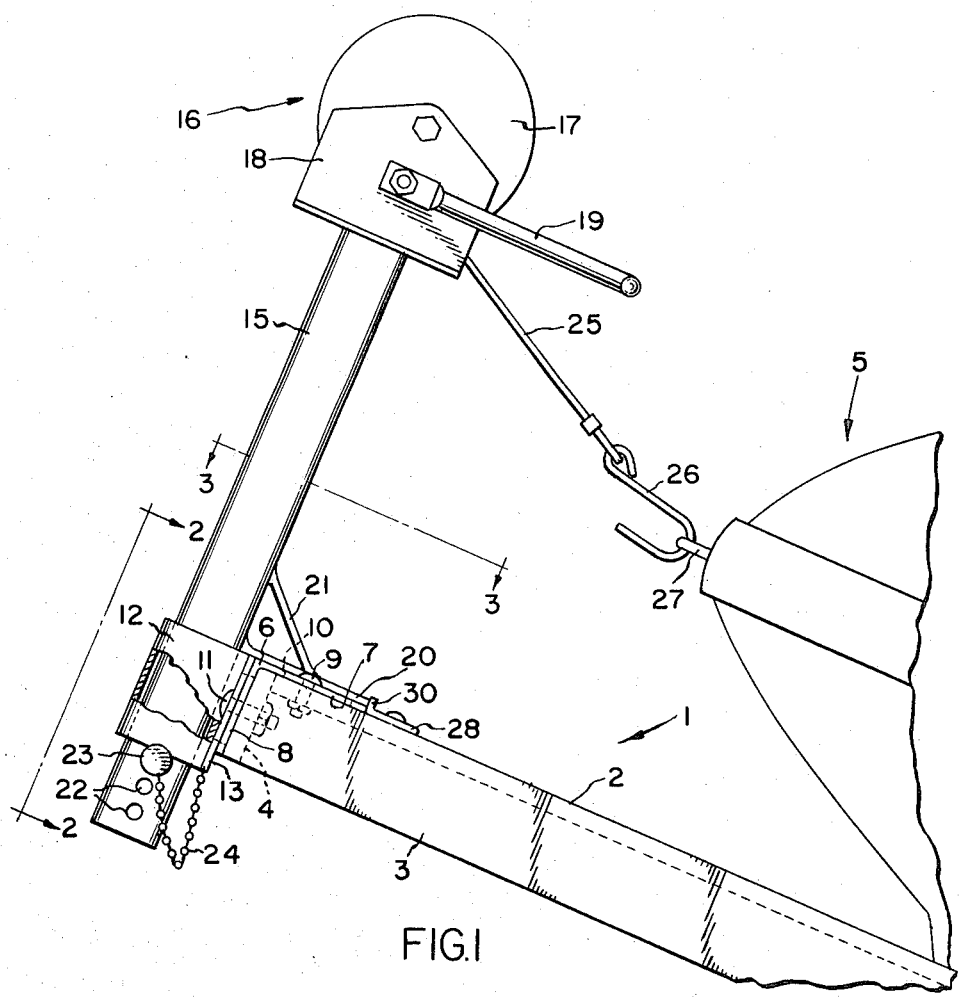
FIG. 1 is a fragmentary, side elevational view of a typical trailer fitted with a winch and winch supporting apparatus constructed in accordance with the invention.
Figure 2:
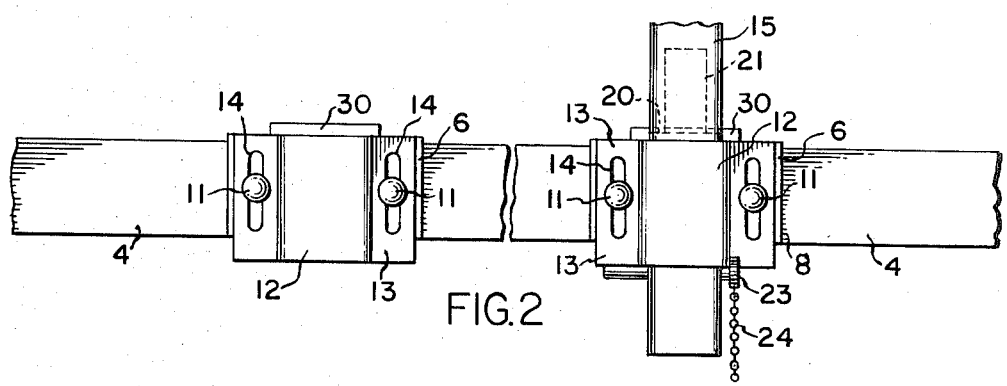
FIG. 2 is a fragmentary, front elevational view of the trailer and taken on the lines 2—2 of FIG. 1.
Figure 3:
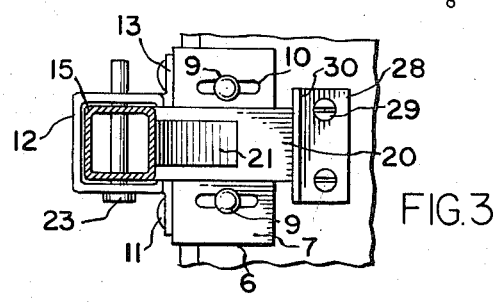
FIG. 3 is a sectional view taken on the line 3—3 of FIG. 1.

Apparatus constructed in accordance with the invention is adapted for use on a conventional trailer 1 having a flat supporting bed 2 from which side and end frame members 3 and 4, respectively, depend. The bed 2, together with its supporting frame members, conventionally is rockably mounted on a frame (not shown) provided with an axle (not shown) on which ground engaging wheels (not shown) are journaled. The trailer 1 preferably is of such width as to accommodate two snowmobiles in side-by-side relation, one of which is shown partially at 5, but the trailer may be of any desired width.

At one end of the trailer, and preferably at the forward end, is at least one right-angular bracket 6 having a first leg 7 which rests upon the upper surface of the trailer bed 2 and a second leg 8 which bears against the end frame member 4. The bracket 6 is secured to the bed 2 by bolts 9 which extend through slots 10 in the leg 7 and through openings in the trailer bed 2. The bracket 6 also is secured to the frame member 4 by bolts 11 which extend through slots in the leg 8 and through openings in the member 4. The slots in the respective members 7 and 8 enable the bracket 6 to be mounted on trailers of varying bed thickness.

Mounted on the leg 8 of the bracket 6 is a preferably square sleeve or socket 12 that is welded or otherwise suitably fixed to a plate 13 that bears against the leg 8 and has slots 14 located therein in such positions as to receive the bolts 11 and mount the sleeve 12 on the bracket 6.

The apparatus also includes an elongate, hollow, preferably square body 15 at one end of which is secured a rotary winch 16 having a reel 17 journaled in support members 18 for rotation in response to rotation of a crank 19. The crank could be replaced by an electric drive motor, if desired. The opposite end of the body 15 is free and is of such size as slidably to be accommodated in the sleeve 12.

Between the ends of the body 15 is welded a laterally projecting foot 20 of such length as to extend well beyond the sleeve when the body is fitted into the sleeve. The foot is reinforced by a brace 21 that extends between and is welded to the foot 20 and to the body 15. The lower end of the body 15 is provided with a number of aligned pairs of openings 22 in any selected pair of which may be positioned a removable latch pin 23 having a length greater than the width of the body 15 so as to enable the pin to prevent inadvertent upward movement of the body out of the sleeve 12. The pin may be secured to one end of a retaining chain 24, the other end of which is anchored to the plate 13.

To condition the apparatus for use, the mounting bracket 6 will be secured to one end of the trailer 1 and the sleeve 12 mounted on the bracket 6. The lower end of the body 15 then may be fitted in an upright position into the sleeve with the foot 20 so arranged as to overlie the trailer bed 2. Engagement of the foot 20 with the upper edge of the plate 13, or with the bracket leg 7, will determine the extent to which the body 15 may be slid into the sleeve 12. The pin 23 then may be fitted into one of the pairs of openings 22. In these positions of the parts, a line or cable 25 carried by the winch reel 17 may be extended from the latter across the bed so as to enable a hook 26 or the like at the free end of the line to be coupled to an eye 27 or the like fitted to one end of the snowmobile 5. The winch reel 17 then may be rotated in such direction as to wind the cable about the reel and drag the snowmobile onto the trailer bed 2.

The side and end frame members 3 and 4 of conventional snowmobile trailers are relatively weak and cannot tolerate any significant torsional force. Were it not for the foot 20, therefore, the torsional force imposed on the frame member 4 by the weight of the snowmobile 5 would result in failure of the frame member 4. The foot 20, however, prevents the application of torsional force to the member 4 and causes such force to be borne by the trailer bed 2 which conventionally is much more capable of withstanding loads than is the member 4.

In those instances in which the trailer bed 2 is of doubtful strength, a reinforcing plate 28 can be secured to the upper surface of the trailer bed 2 by screws 29, the plate having an upstanding abutment 30 against which the free end of the foot 20 abuts so as to provide further resistance to rocking movement of the body 15 relative to the trailer 1.

Following the loading of the snowmobile onto the trailer, the body 15 and the winch 16 may be removed from the sleeve 12 and stored in a protected area, such as the trunk of a vehicle, so as to protect the winch against theft and against deterioration due to weather.

If the trailer 1 is of sufficient width to carry two snowmobiles side-by-side, the frame member 4 may be provided with a pair of mounting brackets 6 and a pair of sleeves 12, together with their associated parts. These members may remain permanently on the trailer 1 and the body 15 may be fitted into first one and then the other of the sleeves 12 so as to enable first one and then the other snowmobile to be loaded onto the trailer.

The disclosed embodiment is representative of the presently preferred form of the invention, but is intended to be illustrative rather than definitive thereof. The invention is defined in the claims.

I claim:

1. In combination with a trailer for supporting one or more articles, said trailer having a supporting bed; at least one sleeve member open at its opposite ends mounted at one end of said bed; an upright body slideably and removably accommodated in said sleeve; a rotary winch carried by said body at its upper end; and a foot carried by said body between its ends and extending from said body in such direction and being of such length that it extends beyond said sleeve and overlies said bed.

2. The construction set forth in claim 1 including a brace extending between and connected to said body and said foot.

3. The construction set forth in claim 1 including releasable latch means carried by said body at its lower end below the level of said sleeve.

4. The construction set forth in claim 3 wherein said latch means comprises a pin removably accommodated in selected openings formed in said body.

5. The construction set forth in claim 1 including abutment means fixed on said bed and abutting said foot.

* * * * *